(12) United States Patent
Lu

(10) Patent No.: US 8,448,998 B2
(45) Date of Patent: May 28, 2013

(54) ACCESSORY SECURING MECHANISM

(75) Inventor: Pen-Uei Lu, Taipei County (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 578 days.

(21) Appl. No.: 12/550,930

(22) Filed: Aug. 31, 2009

(65) Prior Publication Data

US 2010/0124000 A1    May 20, 2010

(30) Foreign Application Priority Data

Nov. 19, 2008    (CN) .......................... 2008 1 0305633

(51) Int. Cl.
E05C 1/08    (2006.01)
(52) U.S. Cl.
USPC ............................ 292/163; 379/450; 379/457

(58) Field of Classification Search
USPC .................... 292/163; 455/575.6; 379/450 X, 379/446, 454, 455, 457 X; 16/406, 428; 24/115 R, 136 R, 136 K, 115 G
See application file for complete search history.

(56) References Cited

U.S. PATENT DOCUMENTS 4,622,723 A * 11/1986 Krauss ......................... 24/115 G
5,737,412 A * 4/1998 Yamashita .................... 379/446

\* cited by examiner

*Primary Examiner* — Carlos Lugo
*Assistant Examiner* — Mark Williams
(74) *Attorney, Agent, or Firm* — Altis Law Group, Inc.

(57) ABSTRACT

An accessory securing mechanism includes a housing member, a securing member, and elastic members. The housing defines an assembly recess, the assembly recess forms a protrusion to engage a string, the securing member and the elastic member are received in the assembly recess, the elastic member resists the securing member, and the securing member resists the protrusion to secure the string.

9 Claims, 3 Drawing Sheets

ACCESSORY SECURING MECHANISM

BACKGROUND

1. Technical Field

The present disclosure relates to an accessory securing mechanism for a portable electronic device.

2. Description of Related Art

With development of wireless communication technology, portable electronic devices such as mobile phones are widely used. A typical accessory securing mechanism applied therein has a through aperture defined in a housing member of the portable electronic device. The through aperture has two connecting opening ends at the housing member, and accordingly forms a engaging wall therebetween. To assemble an accessory such as a string to the portable electronic device, the string is usually passed through one opening end and extends out from the other opening end. The string can be twisted to engage on the engaging wall. However, the engaging wall is apt to failure when the string subjects to a large force, whereby the housing member is broken and difficult to repair.

Therefore, there is room for improvement within the art.

BRIEF DESCRIPTION OF THE DRAWING

Many aspects of the present accessory securing mechanism in electronic device can be better understood with reference to the following drawings. The components in the various drawings are not necessarily drawn to scale, the emphasis instead being placed upon clearly illustrating the principles of the present accessory securing mechanism in electronic device. Moreover, in the drawings, like reference numerals designate corresponding parts throughout the diagrams.

DETAILED DESCRIPTION OF THE EMBODIMENT

Figure 1:
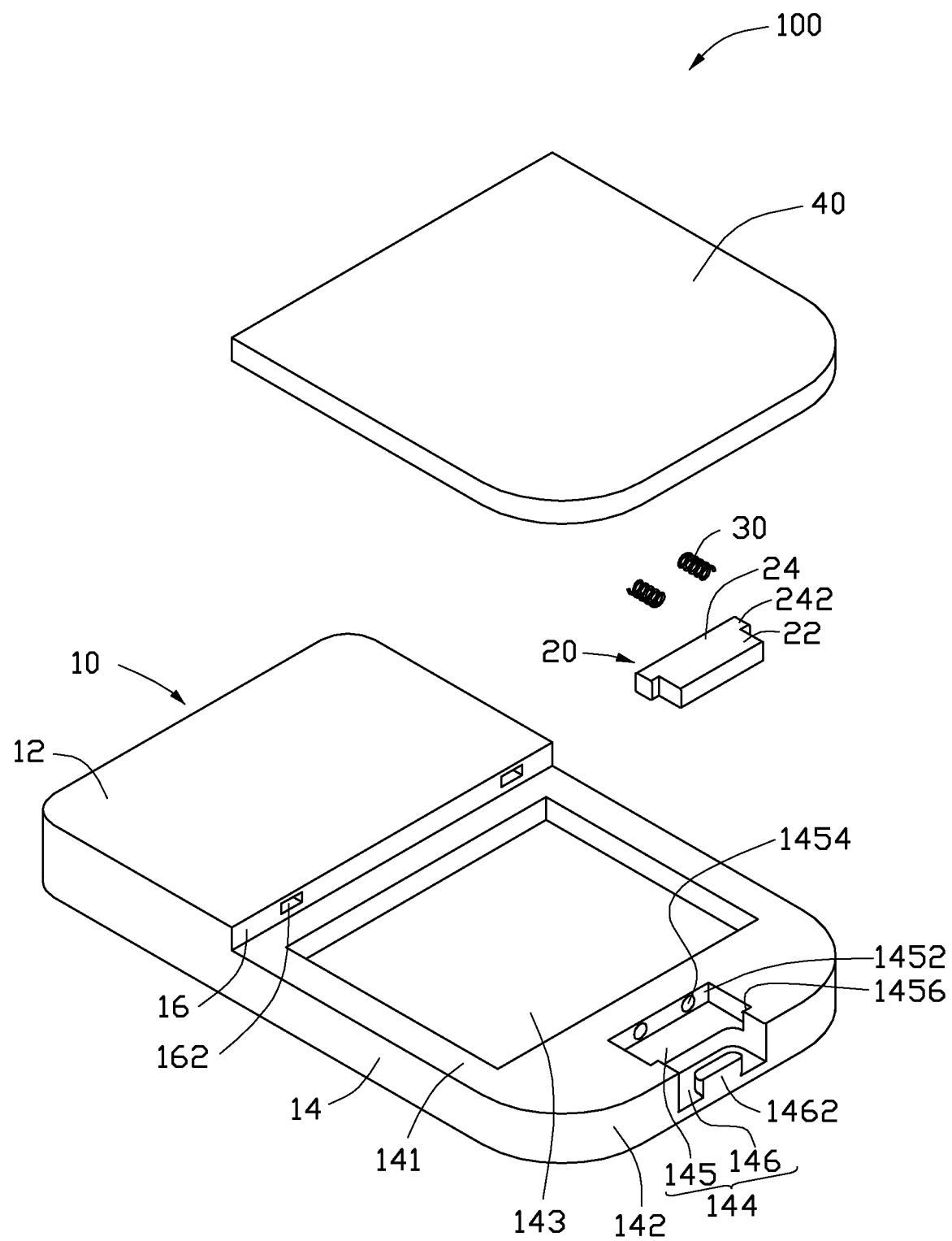
FIG. 1 is an exploded, isometric view of an accessory securing mechanism in an electronic device according to an exemplary embodiment.

Referring to FIG. 1, an exemplary accessory securing mechanism 100, applicable in mobile phones and other portable electronic devices, includes a housing member 10, a securing member 20, two elastic members 30, and a cover member 40. The securing member 20 is assembled and slidably disposed within the housing member 10 by resistance of the elastic member 30. The cover member 40 detachably engages the housing member 10.

The housing member 10 includes a main end portion 12 and an engaging end portion 14. The main end portion 12 has a latching surface 16 perpendicular to the engaging end portion 14. The engaging end portion 14 includes an upper surface 141 and a side surface 142 at a distal end thereof. An exposed receiving cavity 143 and an exposed assembly recess 144 are defined in the upper surface 141. The receiving cavity 143 is located at the middle of upper surface 141 for receiving a battery. The assembly recess 144 is located at the end of the engaging end portion 14. The assembly recess 144 is stepped including a shallow recessed section 145 and a deep cutout 146, the cutout 146 communicates with the recessed section 145 and communicates through the side surface 142. The recessed section 145 includes a sidewall 1452 facing the cutout 146. The sidewall 1452 defines two receiving holes 1454 for receiving the two elastic members 30 respectively. The width of the recessed section 145 exceeds that of the cutout 146, accordingly, two stepped limiting portions 1456 are formed between the recessed section 145 and the cutout 146. The cutout 146 receives a portion of an accessory such as a string. A protrusion 1462 is formed on the bottom surface of the cutout 146 for engaging the string. The latching surface 16 defines two locking holes 162 for a lock of the cover member 40 and the housing member 10.

The securing member 20 includes a first plate portion 22 and a second plate portion 24 connecting to the first plate portion 22. The second plate portion 24 is wider than the first plate portion 22 and thus forms two lugs 242. The first plate portion 22 is substantially the same width as the cutout 146, the second plate portion 24 is substantially the same width as the recessed section 145. The second plate portion 24 is shorter than the recessed section 145. The securing member 20 can be engagingly received in the assembly recess 144 and is capable of sliding longitudinally therein. The two lugs 242 can resist the two limiting portion 1456 by elastic force of the elastic members 30.

The elastic members 30 are coil springs and can be received in the receiving holes 1454 respectively for directly resisting the end portion of securing member 20.

The cover member 40 includes hooks (not shown) latching the locking holes 162 and a latching mechanism (also not shown) in the area of securing member 20. Thus, the cover member 40 can be secured to the housing member 10.

Figure 2:
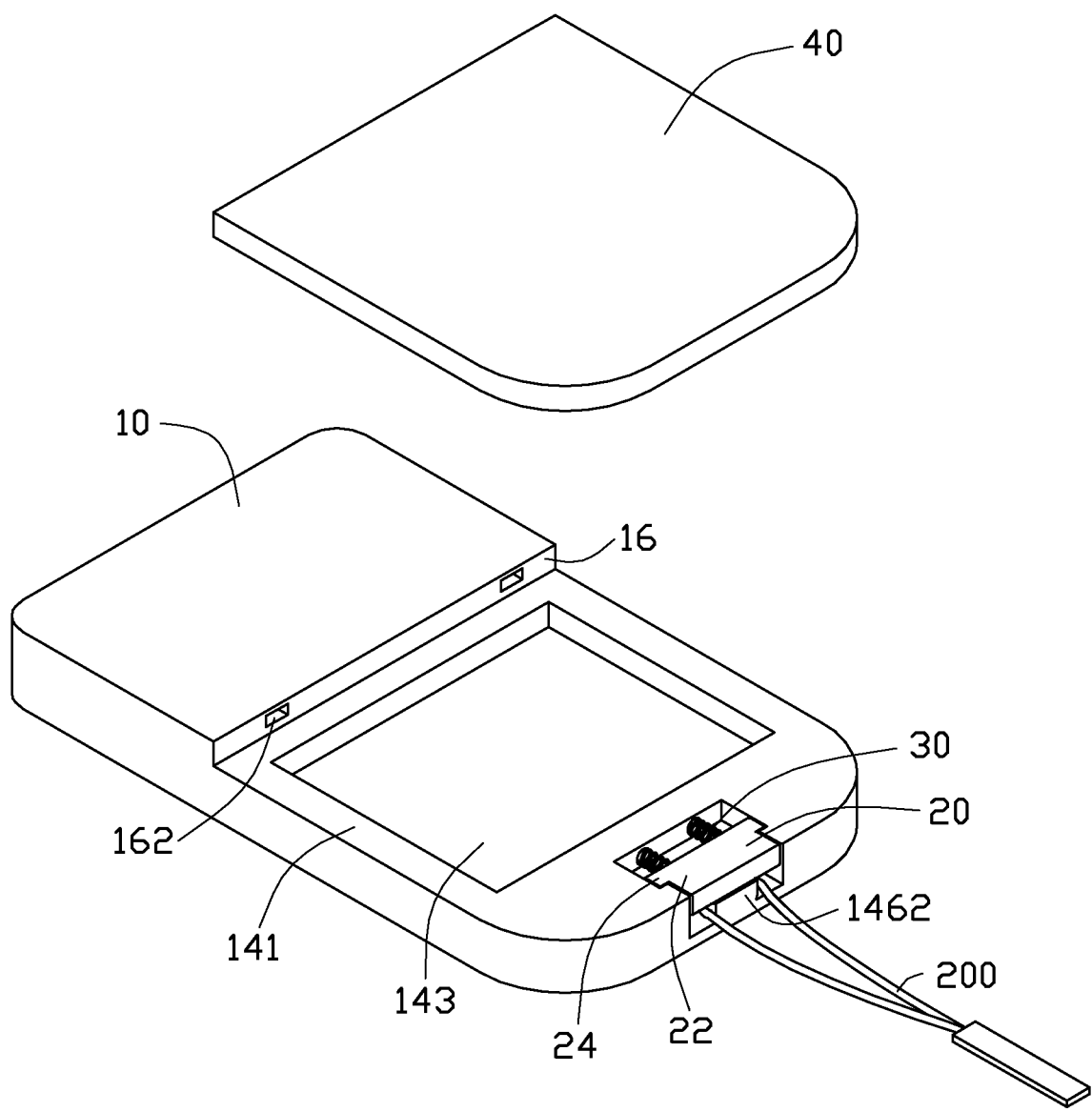
FIG. 2 is an isometric view of the assembly structure shown in FIG. 1 during assembly.
Figure 3:
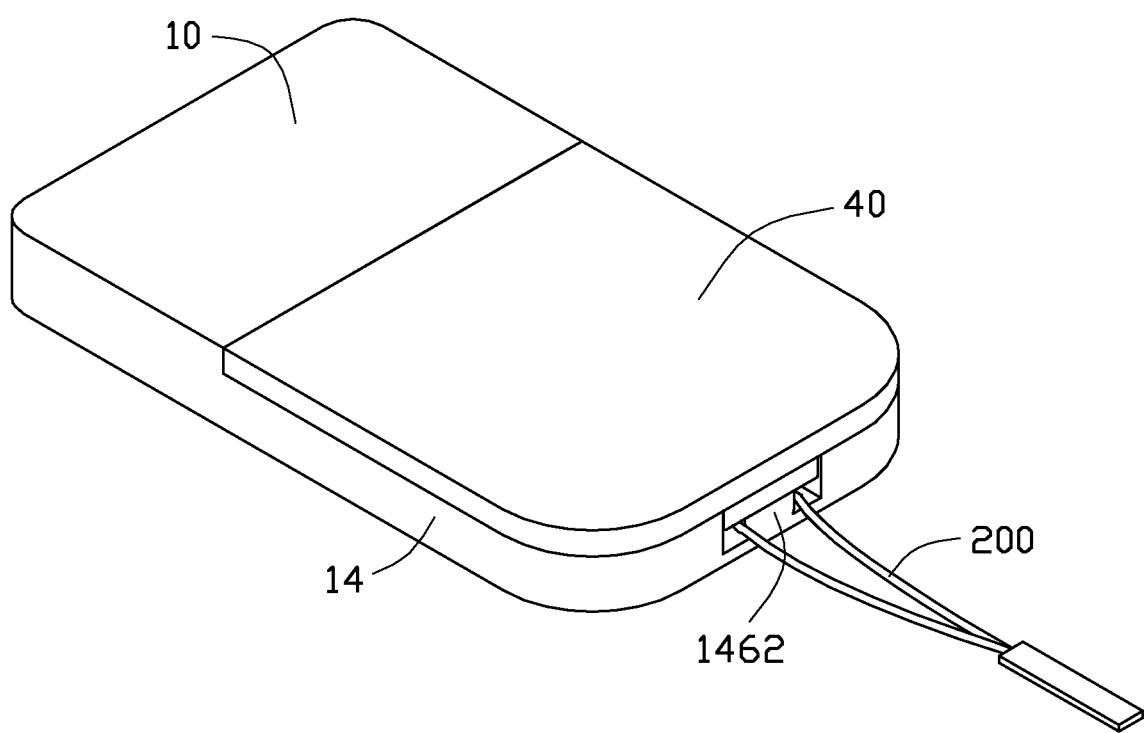
FIG. 3 is an assembled, isometric view of the assembly structure shown in FIG. 1.

Referring to FIGS. 2 and 3, during assembly of the accessory securing mechanism 100, a string 200 is provided to affix to the housing member 10. An end portion of the string 200 engages the protrusion 1462. The remaining portion of the string 200 is outside the cutout 146. The two elastic members 30 are received in the receiving hole 1454 with their end portions exposed. The securing member 20 is secured in the assembly recess 144. During this stage, the first plate portion 22 is received in the recessed section 145 along with the two elastic members 30 abutting and resisting the first plate portion 22. The two lugs 242 resist the two limiting portion 1456 by force from the elastic members 30. The second plate portion 24 is received in the cutout 146 and covers the protrusion 1462. At this time, the end portion of the string 200 is locked by the second plate portion 24 and thus is retained in position by the protrusion 1462. The cover member 40 is secured to the housing member 10 by the hooks of the cover member 40 engaging the locking holes 162 of the housing member 10.

It is to be understood that the limiting portions can be omitted, such that the width of the cutout 146 is substantially the same as the recessed section 145. Accordingly, the protrusion 1462 may further extend until its top surface is coplanar with the upper surface 141 of the engaging end portion 14.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An accessory securing mechanism for securing a string, comprising:

a housing member defining an assembly recess;

a securing member; and at least one elastic member;

wherein the assembly recess forms a protrusion to engage the string, the protrusion is a part of the housing, a portion of the string passes through the assembly recess and is retained in position by the protrusion, the securing member and the elastic member are received in the assembly recess, the elastic member resists the securing member, and the securing member resists the protrusion to secure the string;

wherein the housing member further includes an engaging end portion, the accessory securing mechanism comprises a cover member to engage the engaging end portion; and wherein the engaging end portion defines a receiving cavity receiving a battery and the assembly recess, and the assembly recess is defined through the side surface of the housing member.

2. The accessory securing mechanism as claimed in claim 1, wherein the assembly recess includes a recessed section and a cutout, a depth of the cutout is greater than a depth of the recessed section, so that the protrusion protrudes from the bottom of the cutout, and a top surface of the protrusion is coplanar with a bottom surface of the recessed section.

3. The accessory securing mechanism as claimed in claim 2, wherein the recessed section forms two limiting portions relative to the cutout, the securing member includes a first plate portion and a second plate portion, the second plate portion forms two lugs relative to the first plate portion, the first plate portion is received in the cutout, the second plate portion is received in the recessed section, and the two lugs resist the two limiting portions.

4. The accessory securing mechanism as claimed in claim 3, wherein the recessed section is longer than the second plate portion, the width of the recessed section is the same as that of the second plate portion.

5. The accessory securing mechanism as claimed in claim 3, wherein the width of the cutout is the same as that of the first plate portion.

6. The accessory securing mechanism as claimed in claim 1, wherein the recessed section comprises a sidewall facing the cutout, and the sidewall defines two receiving holes to receive the elastic members correspondingly.

7. An accessory securing mechanism for securing a string, comprising:

a housing member defining an assembly recess;

a securing member; and at least one elastic member;

wherein the assembly recess forms a protrusion to engage the string, the protrusion is a part of the housing member, a portion of the string passes through the assembly recess and is retained in position by the protrusion, the securing member and the elastic member are received in the assembly recess, an end of the securing member is resisted by the elastic member, and the other end of the securing member resists the protrusion to secure the string;

wherein the housing member further includes an engaging end portion, the accessory securing mechanism comprises a cover member to engage the engaging end portion; and wherein the engaging end portion defines a receiving cavity receiving a battery and the assembly recess, and the assembly recess is defined through the side surface of the housing member.

8. The accessory securing mechanism as claimed in claim 7, wherein the assembly recess comprises a recessed section and a cutout, a depth of the cutout is greater than a depth of the recessed section, so that the protrusion protrudes from the bottom of the cutout and the top surface of the protrusion is coplanar with the top surface of the recessed section.

9. The accessory securing mechanism as claimed in claim 7, wherein the elastic member is resisted between the sidewall of the recessed section and the securing member.

\* \* \* \* \*